(12) United States Patent
Deng et al.

(10) Patent No.: US 12,265,866 B2
(45) Date of Patent: Apr. 1, 2025

(54) METHODS AND SYSTEMS FOR ENCODING RADIO FREQUENCY IDENTIFICATION (RFID) LABELS

(71) Applicant: Hand Held Products, Inc., Charlotte, NC (US)

(72) Inventors: Yongpeng Deng, Shenzhen (CN); Quanjin Shi, Shenzhen (CN); Zhiyong Zhu, Shenzhen (CN); Jian Zeng, Shenzhen (CN)

(73) Assignee: Hand Held Products, Inc., Charlotte, NC (US)

( * ) Notice: Subject to any disclaimer, the term of this patent is extended or adjusted under 35 U.S.C. 154(b) by 0 days.

(21) Appl. No.: 18/342,471

(22) Filed: Jun. 27, 2023

(65) Prior Publication Data

US 2025/0005314 A1    Jan. 2, 2025

(51) Int. Cl.
*G06K 19/07* (2006.01)

(52) U.S. Cl.
CPC ................ *G06K 19/0723* (2013.01)

(58) Field of Classification Search
CPC ............. G06K 7/0008; G06K 19/0723; G06K 19/07749; G06K 19/0776; G06K 17/0025; G06K 15/024; G06K 1/12; G06K 1/20
See application file for complete search history.

(56) References Cited

U.S. PATENT DOCUMENTS

| | | |
|---|---|---|
| 8,217,758 B2 | 7/2012 | Maruo et al. |
| 10,339,429 B2 | 7/2019 | Duckett |
| 2009/0207002 A1* | 8/2009 | Maruo ............... G06K 7/0008 340/10.51 |
| 2010/0141394 A1* | 6/2010 | Sugiyama ........... G06K 7/0008 340/10.4 |
| 2016/0154618 A1* | 6/2016 | Duckett ............ G06K 19/0723 358/1.15 |

FOREIGN PATENT DOCUMENTS

| | | | | |
|---|---|---|---|---|
| CN | 104044355 B | | 12/2016 | |
| EP | 1688353 B1 | * | 9/2007 | ............... B65C 9/02 |
| EP | 2083378 B1 | | 4/2017 | |
| JP | 2007006468 A | * | 1/2007 | ......... G06K 19/0705 |

OTHER PUBLICATIONS

Khaliel, "Printable, High Coding Capacity Chipless RFID Tags for Low-Cost Item Tagging" (Year: 2017).*
Briand, "Printed sensors on smart RFID labels for logistics" (Year: 2012).*

* cited by examiner

*Primary Examiner* — Thien T Mai
(74) *Attorney, Agent, or Firm* — Alston & Bird LLP

(57) ABSTRACT

Systems and methods for encoding radio frequency identification (RFID) labels are provided. The method includes, but not limited to: determining a slow-down position, an encoding complete position, and an encoding window for each label; determining if the encoding complete position is positioned on a front side of the slow-down position when viewed from the media moving direction; in an instance in which the encoding complete position is positioned on the front side of the slow-down position when viewed from the media moving direction, causing the media to reduce the printing speed when the trailing edge of the encoding window reaches the slow-down position; and in an instance in which the encoding complete position is positioned on a back side of the slow-down position when viewed from the media moving direction, causing the media to maintain the printing speed at the predetermined printing speed.

20 Claims, 8 Drawing Sheets

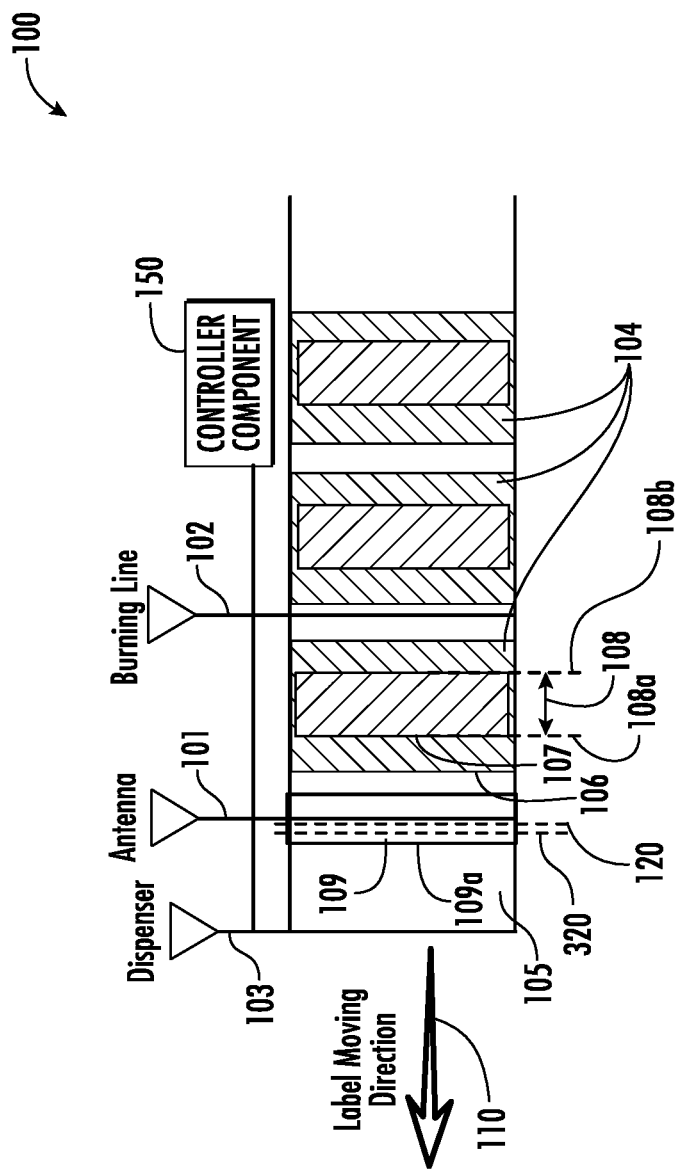

METHODS AND SYSTEMS FOR ENCODING RADIO FREQUENCY IDENTIFICATION (RFID) LABELS

FIELD OF THE INVENTION

Exemplary embodiments of the present disclosure relate generally to methods for radio frequency identification (RFID), and more particularly, in some examples, to methods, apparatuses, and systems for encoding RFID labels.

BACKGROUND

Applicant has identified many technical challenges and difficulties associated with encoding RFID labels. Through applied effort, ingenuity, and innovation, Applicant has solved problems relating to methods for encoding RFID labels by developing solutions embodied in the present disclosure, which are described in detail below.

BRIEF SUMMARY

Various embodiments described herein relate to components, apparatuses, and systems for monitoring an internal organ temperature.

In accordance with various embodiments of the present disclosure, a method for encoding radio frequency identification (RFID) labels with a controller component of a printer is provided. The method includes, but not limited to: determining a slow-down position and an encoding complete position along a media moving direction in the printer, and an encoding window for each label to perform an encoding process for the at least one RFID inlay, where the encoding window comprises a leading edge and a trailing edge, where the label is part of a media that is traveling along the media moving direction in the printer at a predetermined printing speed and comprises at least one RFID inlay; starting the encoding process on the at least one RFID inlay in an instance in which the leading edge reaches an encoding area of an RFID antenna; determining if the encoding complete position is positioned on a front side of the slow-down position when viewed from the media moving direction; in an instance in which the encoding complete position is positioned on the front side of the slow-down position when viewed from the media moving direction, causing the media to reduce the printing speed when the trailing edge of the encoding window reaches the slow-down position; and in an instance in which the encoding complete position is positioned on a back side of the slow-down position when viewed from the media moving direction, causing the media to maintain the printing speed at the predetermined printing speed.

In some embodiments, the leading edge is positioned on a front side of the trailing edge when viewed from the media moving direction, In some embodiments, the printing speed is reduced to zero in an instance in which the trailing edge reaches a downstream edge of the encoding area of the RFID antenna.

In some embodiments, the encoding complete position is determined based on the predetermined printing speed and an encoding speed of the RFID antenna.

In some embodiments, the method further comprise: determining if the encoding process is completed; in an instance in which the encoding process is completed, causing the media to increase the printing speed; and in an instance in which the encoding process is not completed, continuing causing the media to reduce the printing speed.

In some embodiments, the printing speed is increased to the predetermined printing speed after the encoding process is completed.

In some embodiments, the slow-down position is determined based on the predetermined printing speed.

In some embodiments, the RFID antenna is communicatively coupled to the controller component and configured to transmit signals to encode the at least one RFID inlay.

In some embodiments, the printer further comprises a print head communicatively coupled to the controller component and configured to print contents on the at least one label.

In some embodiments, the printer further comprises a dispenser communicatively coupled to the controller component and configured to output the media.

According to another embodiment, a printer for encoding radio frequency identification (RFID) labels is provided. The printer includes, but not limited to: an RFID antenna; and a controller component, where the controller component is configured to: determine an encoding window for each label to perform an encoding process for the at least one RFID inlay, where the encoding window comprises a leading edge, a slow-down position, and an encoding complete position on the media, where the label is part of a media that is traveling along a media moving direction in the printer at a predetermined printing speed and comprises at least one RFID inlay; start the encoding process on the at least one RFID inlay in an instance in which the leading edge reaches an encoding area of an RFID antenna; determine if the encoding complete position is positioned on a back side of the slow-down position when viewed from the media moving direction; in an instance in which the encoding complete position is positioned on the back side of the slow-down position when viewed from the media moving direction, cause the media to reduce the printing speed when the slow-down position reaches an encoding area of the RFID antenna; and in an instance in which the encoding complete position is positioned on a front side of the slow-down position when viewed from the media moving direction, cause the media to maintain the printing speed at the predetermined printing speed.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which:

FIG. 3A illustrates an example diagram illustrating an example printer for encoding RFID labels, in accordance with various embodiments of the present disclosure;

DETAILED DESCRIPTION OF THE INVENTION

Figure 1:
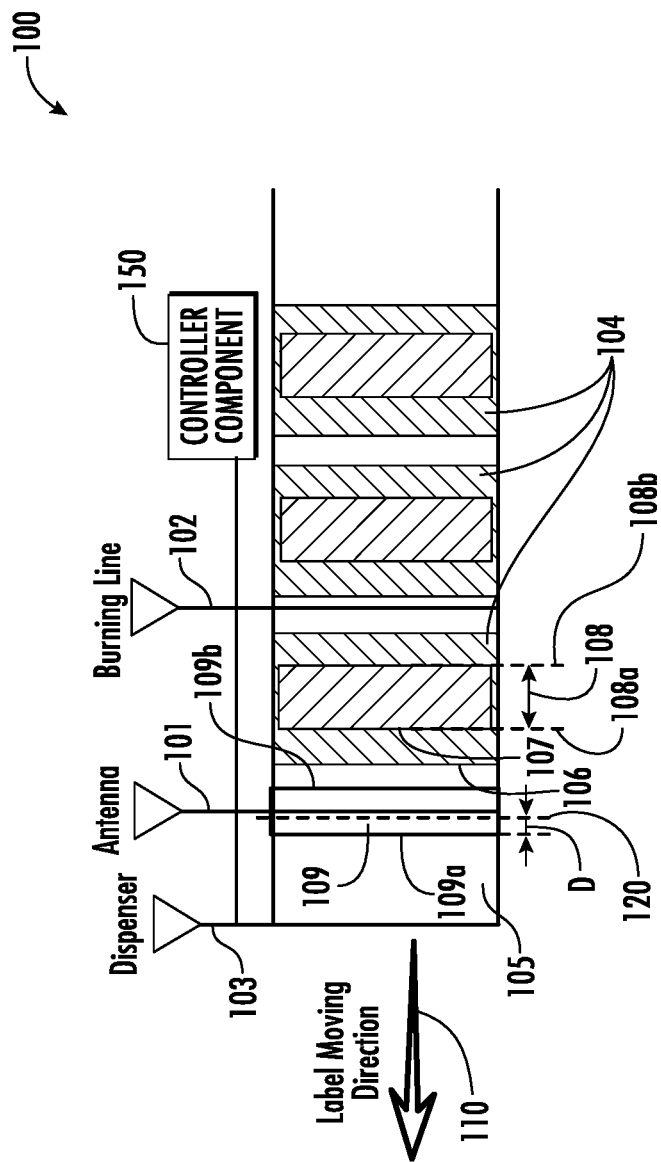
FIG. 1 illustrates an example diagram illustrating an example printer for encoding the RFID labels, in accordance with various embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as "comprises", "includes", and "having" should be understood to provide support for narrower terms such as "consisting of", "consisting essentially of", and "comprised substantially of".

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

The term "radio frequency identification (RFID) inlay" is used herein to correspond to an RFID tag that includes at least an integrated circuit (IC), an antenna element, and a substrate. In an example embodiment, the antenna element and the IC are fabricated on the substrate. Further, the IC is communicatively coupled to the antenna element, such as through an interconnect on the substrate. In an example embodiment, the integrated circuit in the RFID inlay may be configured to store encoded information or the encoded data. In some examples the RFID inlay may be configured to operate in various RF frequency bands such as, but not limited to, 13.56 MHZ (hereinafter High Frequency Band) or 860 MHZ-960 MHZ (UHF band). In some example embodiments, the RFID inlay may have a dedicated power source that may enable the RFID inlay to communicate with one or more components, such as an RFID encoder and an RFID reader. Such RFID inlays are referred to as active RFID inlays. In alternative or additional example embodiments, the RFID inlay may not have a dedicated power source. In such embodiments, the RFID inlay may have a power coupler that is capable of inducing electrical charge when the RFID inlay is brought in an RF field. The induced electrical charge is thereafter used to power the RFID inlay itself.

The word "media" is used herein to mean a printable medium, such as a label, a page, paper, or substrate, on which content, such as graphics, text, and/or visual images, may be printable. In some embodiments, the media may correspond to a continuous media that may be loaded in a printer, such as a thermal printer, an RFID printer, or the like in form of a roll or a stack, or may correspond to media that may be divided into a plurality of labels through perforations defined along a width of the media. Alternatively or additionally, the media may be divided into the plurality of labels through one or more marks or perforations that are defined at a predetermined distance from each other, along the length of the media. In some example embodiments, a contiguous stretch of the media, between two consecutive marks or two consecutive perforations, corresponds to a label of the media. In an example embodiment, each label of the plurality of labels includes a corresponding RFID inlay.

Various example embodiments address exemplary technical problems associated with encoding RFID labels with an encoding device, such as an RFID printer. As understood by those of skill in the field to which the present disclosure pertains, for example, an RFID printer may be a combination of a printer, such as a thermal printer, an ink printer, and/or a laser printer and a RFID reader/writer. For example, an RFID printer may be configured to print contents (e.g., but not limited to numbers, characters, or pictures) on media, and simultaneously to read/write or otherwise encoding information and/or data on an RFID inlay.

However, in some examples, the RFID printer may need to retract or otherwise slow the media to make sure or otherwise confirm that the encoding process (e.g., but not limited to read/write encoded information or encoded data) on the RFID inlay is completed on each RFID label before the corresponding RFID label moves past the encoding area of the antenna of the RFID printer. Therefore, there is a limitation on the printing speed and/or the success rate of RFID printers using existing technologies.

To address at least these exemplary problems as well as others, example systems and methods described herein determine a slow-down position and an encoding complete position along a media moving direction in the printer, and an encoding window for each label to perform an encoding process for the RFID inlay. For example, the encoding window may comprise a leading edge and a trailing edge on each label. In some examples, the RFID printer may determine if the encoding complete position is positioned on a front side of the slow-down position when viewed from the media moving direction. In an instance in which the encoding complete position is positioned on a front side of the slow-down position when viewed from the media moving direction, the RFID printer may cause the media to reduce the printing speed when the trailing edge of the encoding window reaches the slow-down position, such that the trailing edge may stop at a downstream edge of the encoding area of the RFID antenna to continue encoding the RFID inlay. Thus, in some examples, the printing speed of the RFID printer is dynamically adjusted based on the duration of the encoding process. In some examples, various embodiments described in the present disclosure herein are directed to improve the printing speed while ensuring the success rate on the RFID printer.

Referring now to FIG. 1, an example diagram illustrating an example RFID printer for encoding RFID labels in accordance with some example embodiments described herein is provided. As shown in FIG. 1, the example printer 100 may comprise an antenna 101, a print head 102, a dispenser 103, and a controller component 150. For example, the example printer 100 may be configured, by the controller component 150, to cause a media 104 to move along a media path 105, such that the print head 102 prints contents on the media 104 and the RFID antenna 101 encodes the media 104.

In some embodiments, the media 104 may comprise at least one label 106, and each of the at least one label 106 may further comprise an RFID inlay 107. In some examples, to encode the RFID inlay 107, the printer may facilitate traversal of the media 104 along the media path 105, and the RFID antenna 101 may be positioned adjacent to the media path to facilitate encoding of the RFID inlay 107.

In some embodiments, the media path 105 may be defined as a travelling path by the example printer 100 along a media moving direction 110. In some examples, the media 104 may be driven by an electrical drive (not shown) to travel along the media path 105. In some examples, the electrical drive may be communicatively coupled to the controller component 150, such that the controller component 150 may transmit commands to the electrical drive.

In some embodiments, the RFID antenna 101 may comprise an RFID coupler/antenna element positioned adjacent to the media path 105 to encode the RFID inlay 107. In some examples, the RFID antenna 101 may be communicatively coupled to the controller component 150, such that the controller component 150 may transit commands and encoded data between the RFID antenna 101 and the controller component 150. In some examples, the RFID antenna 101 may facilitate encoding of an RFID inlay 107, while the media 104 traverses along the media path 105. In some examples, the RFID antenna 101 may be further described in conjunction with FIG. 4.

In some embodiments, the RFID antenna 101 may define an encoding area 109 within which the RFID antenna 101 may be able to effectively communicate with the RFID inlay 107 when the RFID inlay 107 moves within the encoding area 109. In some examples, the encoding area 109 may be dependent on the radiation pattern of the RFID antenna 101 and the output power of the RFID antenna 101. In some examples, the encoding area 109 may be a rectangular area formed between a downstream edge 109a and an upstream edge 109b.

In some embodiments, the print head 102 may be configured to print the contents on the media 104. In some examples, the print head 102 may be positioned on the media path 105. For example, the print head 102 may comprise a plurality of heating elements (not shown) that are energized and pressed against a ribbon (not shown) to perform a print operation. During the print operation, the print head 102 may transfer ink to the media 104 to perform the print operation.

In some embodiments, the dispenser 103 may be configured to output the media 104 along the media path 105. For example, the dispenser 103 may be a slot (not shown) in a housing (not shown) of the example printer 100, through which the at least one label 106 with the RFID inlay 107 may be outputted.

In some embodiments, an encoding window 108 of the RFID inlay 107 may be determined by the controller component 150 to perform an encoding process for the RFID inlay 107.

In some examples, the encoding window 108 may have a same shape as the RFID inlay 107. In some examples, the encoding window 108 may have a smaller size than the RFID inlay 107.

In some examples, the RFID antenna 101 may be able to effectively communicate with the RFID inlay 107 when encoding window 108 overlaps the encoding area 109. For example, as shown in FIG. 1, the encoding window 108 may comprise a leading edge 108a and a trailing edge 108b on each of the at least one label 106. In some examples, the leading edge 108a may be positioned on a front side of the trailing edge 108b when viewed from the media moving direction 110. That is, the leading edge 108a may reach the encoding area 109 before the trailing edge 108b when the media is moving in the media moving direction.

In some examples, the encoding process on the RFID inlay 107 may be started when the leading edge 108a reaches the encoding area 109 of an RFID antenna 101. In some examples, the encoding area 109 of an RFID antenna 101 may be located along the media path 105. In some examples, the encoding area 109 of the RFID antenna 101 may be located between the dispenser 103 and the print head 102.

In some examples, the encoding process on the RFID inlay 107 may be completed before the encoding window 108 passes by the encoding area 109 of the RFID antenna 101. For example, the encoding process on the RFID inlay 107 may be completed before the trailing edge 108b passes by the encoding area 109 of the RFID antenna 101.

In some examples, the media 104 may be configured to stop moving along the media path 105, such the encoding area 109 of the RFID antenna 101 is overlapping with the encoding window 108 until the encoding process is completed. For example, the media 104 may be configured to stop moving along the media path 105, such that the trailing edge 108b stops within the encoding area 109 of the RFID antenna 101 until the encoding process is completed.

In some embodiments, the media may start slowing down before the trailing edge 108b reaches the encoding area 109 of the RFID antenna 101, such that the trailing edge 108b is able to stop within the encoding area 109 of the RFID antenna 101. In some examples, a slow-down position 120 may be positioned along the media path 105 and determined based on a speed V of the media 104 and an acceleration α of the electric drive. In some examples, the speed V of the media 104 may be set at a predetermined printing speed or standard print speed. For example, the media 104 that is driven by the electrical drive may slow down before the encoding window 108 passes by the encoding area 109 of the RFID antenna 101, such that the media 104 is able to stop moving before the trailing edge 108b passes by the encoding area 109 of the RFID antenna 101. In some examples, the slow-down position 120 may be determined based on the predetermined printing speed or standard print speed. For example, as shown in FIG. 1, a distance D between the slow-down position 120 and the downstream edge 109a of the encoding area 109 may be calculated by the following equation (Eq. 1):

$$D = V^2/2\alpha \qquad \text{Eq. 1}$$

where V is a speed of the media 104 and a is an acceleration of the electric drive.

In some examples, the slow-down position 120 may be positioned within the encoding area 109. In some examples, the slow-down position 120 may be positioned out of the encoding area 109.

Figure 2A:
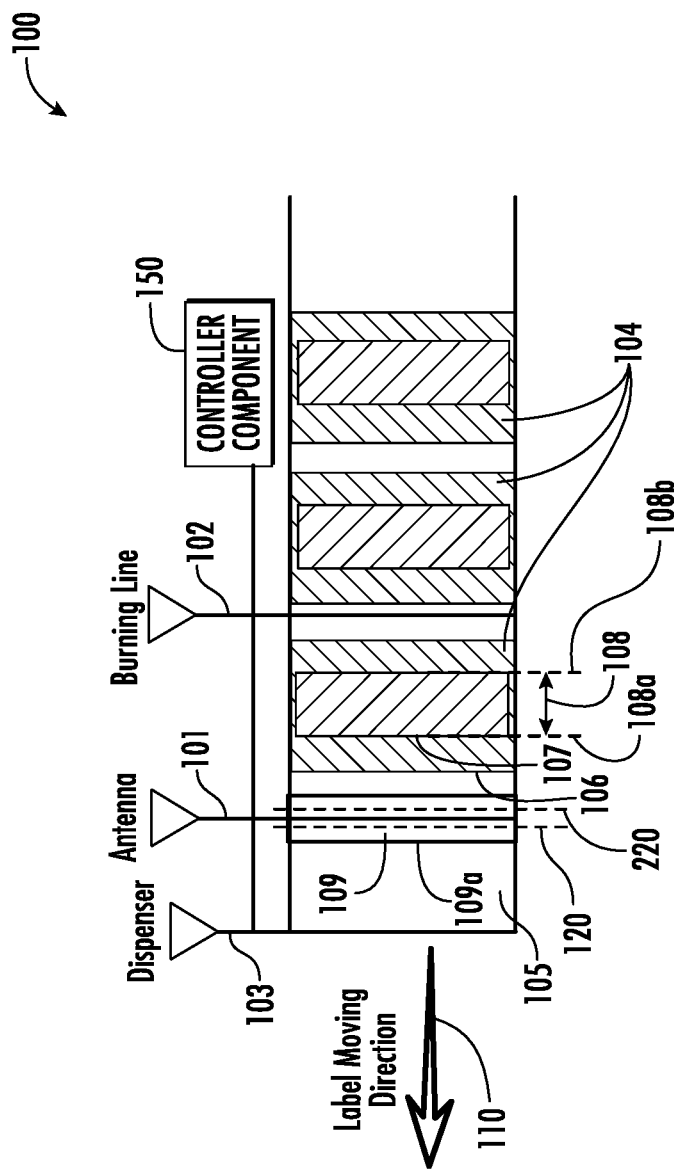
FIG. 2A illustrates an example diagram illustrating an example printer for encoding RFID labels, in accordance with various embodiments of the present disclosure.

Referring now to FIG. 2A, an example diagram illustrating an example printer for encoding RFID labels in accordance with some example embodiments described herein is provided. As shown in FIG. 2A, the example printer 200 may comprise an RFID antenna 101, a print head 102, a dispenser 103, and a controller component 150. For example, the example printer 100 may be configured, by the controller component 150, to cause a media 104 to move along a media path 105, such that the print head 102 prints contents on the media 104 and the RFID antenna 101 encodes the media 104. In some examples, components of the example printer 200 described herein may correspond to the components as described in FIG. 1.

In some embodiments, an encoding complete position 220 may be positioned along the media path 105. For example, the encoding process on the RFID inlay 107 may be completed when the trailing edge 108b reaches the encoding complete position 220. In some examples, in an instance in which the printing speed is maintained at the predetermined printing speed or the standard print speed, the encoding process for the RFID inlay 107 may be completed when the trailing edge 108b reaches the encoding complete position 220. In some examples, the encoding complete position 220 may be determined by the predetermined printing speed and an encoding speed of the RFID antenna 101.

In some examples, the encoding complete position 220 may be positioned within the encoding area 109. In some examples, the encoding complete position 220 may be positioned out of the encoding area 109.

In some embodiments, as shown in FIG. 2A, the encoding complete position 220 may be positioned on a back side of the slow-down position 120 when viewed from the media moving direction 110, such that the encoding window 108 may reach the encoding complete position 220 before the slow-down position 120. That is, the encoding process is complete before the trailing edge 108b reaches the slow-down position 120.

In some examples, in an instance in which the encoding process on the RFID inlay 107 is completed before the trailing edge 108b reaches the slow-down position 120, the speed of the media 104 may be maintained at the predetermined printing speed or the standard print speed.

Figure 2B:
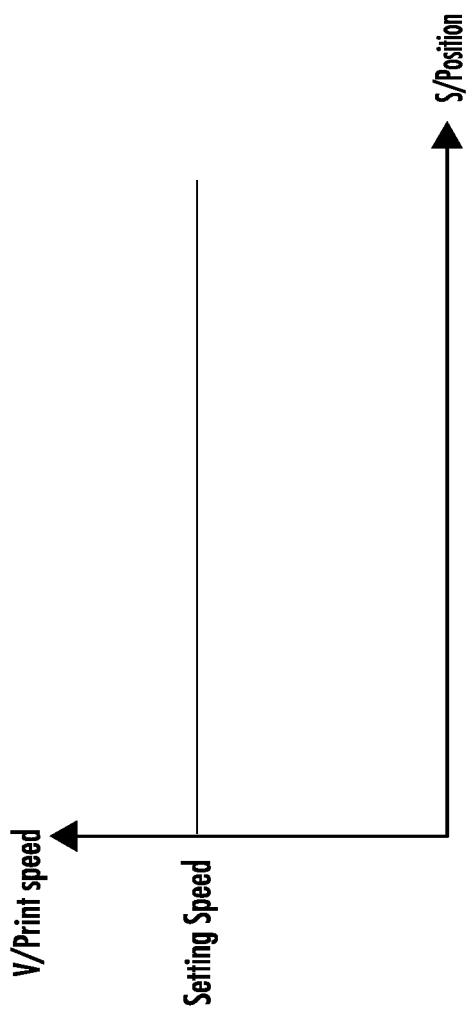
FIG. 2B illustrates an example diagram illustrating an example printing speed of an example printer, in accordance with various embodiments of the present disclosure.

Referring now to FIG. 2B, an example diagram illustrating an example printing speed of an example printer for encoding RFID labels in accordance with some example embodiments described herein is provided.

In some embodiments, as shown in FIG. 2B, the printing speed V of the example printer 200 may be maintained at the predetermined printing speed or standard print speed while the encoding window 108 passes through the encoding area 109 of the RFID antenna 101.

Referring now to FIG. 3A, an example diagram illustrating an example printer for encoding RFID labels in accordance with some example embodiments described herein is provided. As shown in FIG. 3A, the example printer 300 may comprise an RFID antenna 101, a print head 102, a dispenser 103, and a controller component 150. For example, the example printer 100 may be configured, by the controller component 150, to cause a media 104 to move along a media path 105, such that the print head 102 prints contents on the media 104 and the RFID antenna 101 encodes the media 104. In some examples, components of the example printer 300 described herein may correspond to the components as described in FIG. 1.

In some embodiments, an encoding complete position 320 may be positioned along the media path 105. In some examples, in an instance in which the printing speed is maintained at the predetermined printing speed or the standard print speed, the encoding process for the RFID inlay 107 may not be completed when the trailing edge 108b reaches the encoding complete position 320. In some examples, the encoding complete position 320 may be determined by the predetermined printing speed and an encoding speed of the RFID antenna 101.

In some examples, the encoding complete position 320 may be positioned within the encoding area 109. In some examples, the encoding complete position 320 may be positioned out of the encoding area 109.

In some embodiments, as shown in FIG. 3A, the encoding complete position 320 may be positioned on a front side of the slow-down position 120 when viewed from the media moving direction 110, such that the encoding window 108 may reach the slow-down position 120 before the encoding complete position 320. That is, the encoding process is not complete when the trailing edge 108b reaches the slow-down position 120.

In some examples, in an instance in which the encoding process on the RFID inlay 107 is not completed before the trailing edge 108b reaches the slow-down position 120, the speed of the media 104 may start slowing down when the trailing edge 108b reaches the slow-down position 120, such that the media 104 is able to stop moving at or about when the trailing edge 108b reaches the downstream edge 109a of the encoding area 109. For example, the speed of the media 104 may be zero when the downstream edge 109a of the encoding area 109. In some examples, the speed of the media 104 may be maintained at zero, such that the encoding process for the RFID inlay 107 may be completed while the trailing edge 108b is at the downstream edge 109a of the encoding area 109.

In some embodiments, the media 104 may start moving again after the encoding process for the RFID inlay 107 is completed. For example, the speed of the media 104 may increase gradually and be maintained at the predetermined print speed after the encoding process for the RFID inlay 107 is completed.

Figure 3B:
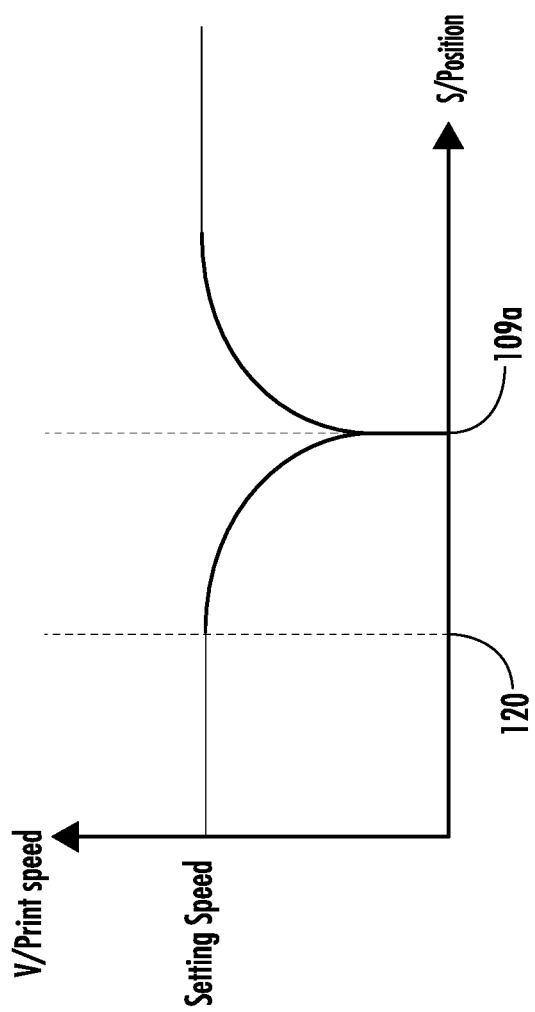
FIG. 3B illustrates an example diagram illustrating an example printing speed of an example printer, in accordance with various embodiments of the present disclosure.

Referring now to FIG. 3B, an example diagram illustrating an example printing speed of an example printer for encoding RFID labels in accordance with some example embodiments described herein is provided.

In some embodiments, as shown in FIG. 3B, the printing speed V of the example printer 300 may be maintained at the predetermined printing speed or standard print speed before the trailing edge 108b of the encoding window 108 reaches the slow-down position 120. In some examples, the printing speed V of the example printer 300 may start slowing down after the trailing edge 108b of the encoding window 108 reaches the slow-down position 120. In some examples, the printing speed V of the example printer 300 may be zero when the trailing edge 108b reaches the downstream edge 109a of the encoding area 109. For example, the speed of the media 104 may be maintained at zero or not moving, such that the encoding process for the RFID inlay 107 may be completed while the trailing edge 108b is at the downstream edge 109a of the encoding area 109. In some examples, the speed of the media 104 may increase gradually and be maintained at the predetermined or standard print speed after the encoding process for the RFID inlay 107 is completed.

Figure 4:
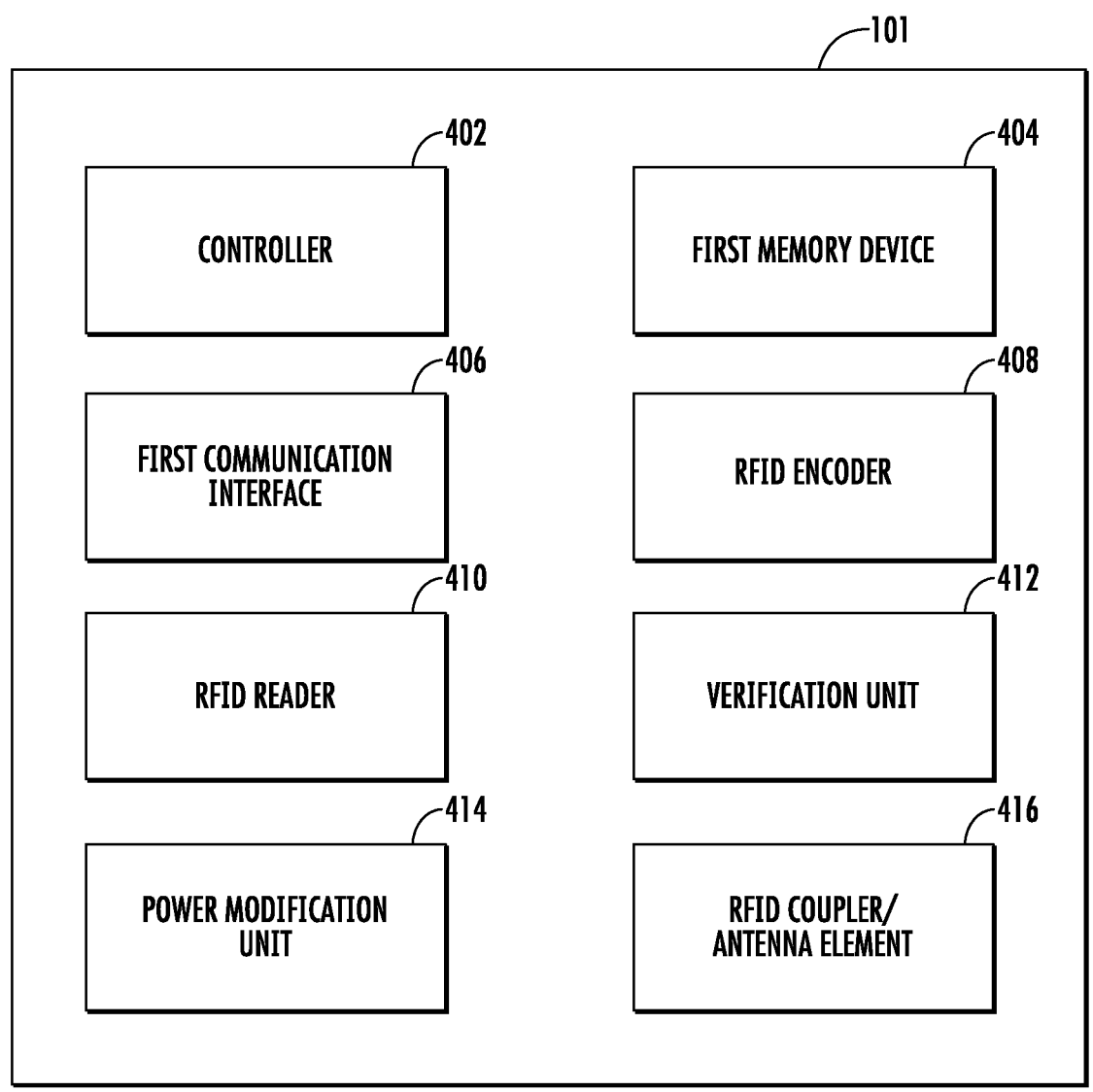
FIG. 4 illustrates an example block diagram of an RFID antenna of an example printer, in accordance with various embodiments of the present disclosure.

FIG. 4 illustrates a block diagram of the RFID antenna 101, according to one or more embodiments described herein. The RFID antenna 101 includes a controller 402, a first memory device 404, a first communication interface 406, an RFID encoder 408, an RFID reader 410, a verification unit 412, a power modification unit 414, and an RFID coupler/antenna element 416.

The controller 402 may be embodied as means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit (ASIC) or field programmable gate array (FPGA), or some combination thereof. Accordingly, although illustrated in FIG. 4 as a single controller, in an embodiment, the controller 402 may include a plurality of controllers and signal processing modules. The plurality of controllers may be embodied on a single electronic device or may be distributed across a plurality of electronic devices collectively configured to function as the circuitry of the RFID antenna 101. The plurality of controllers may be in operative communication with each other and may be collectively configured to perform one or more functionalities of the circuitry of the RFID antenna 101, as described herein. In an example embodiment, the controller 402 may be configured to execute instructions stored in the first memory device 404 or otherwise accessible to the controller 402. These instructions, when executed by the controller 402, may cause the circuitry of the RFID antenna 101 to perform one or more of the functionalities, as described herein.

Whether configured by hardware, firmware/software methods, or by a combination thereof, the controller 402 may include an entity capable of performing operations according to embodiments of the present disclosure while configured accordingly. Thus, for example, when the controller 402 is embodied as an ASIC, FPGA or the like, the controller 402 may include specifically configured hardware for conducting one or more operations described herein. Alternatively, as another example, when the controller 402 is embodied as an executor of instructions, such as may be stored in the first memory device 404, the instructions may specifically configure the controller 402 to perform one or more algorithms and operations described herein.

Thus, the controller 402 used herein may refer to a programmable microprocessor, microcomputer or multiple processor chip or chips that can be configured by software instructions (applications) to perform a variety of functions, including the functions of the various embodiments described above. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. The memory can also be located internal to another computing resource (e.g., enabling computer readable instructions to be downloaded over the Internet or another wired or wireless connection).

The first memory device 404 may include suitable logic, circuitry, and/or interfaces that are adapted to store a set of instructions that is executable by the controller 402 to perform predetermined operations. Some of the commonly known memory implementations include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an embodiment, the first memory device 404 may be integrated with the controller 402 on a single chip, without departing from the scope of the disclosure.

The first communication interface 406 may correspond to a communication interface that may facilitate transmission and reception of messages and data to and from various components of the printer 100, 200, or 300. For example, the first communication interface 406 is communicatively coupled with the controller component 150. Examples of the communication interface may include, but are not limited to, an antenna, an Ethernet port, a USB port, a serial port, or any other port that can be adapted to receive and transmit data. The communication interface transmits and receives data and/or messages in accordance with the various communication protocols, such as, I2C, TCP/IP, UDP, and 2G, 3G, 4G or 5G communication protocols.

The RFID encoder 408 includes suitable logic, and circuitry for encoding data in the RFID inlay 107 included in the at least one label 106 in the media 104. In some example embodiments, the RFID encoder 408 encodes data in the RFID inlay 107, according to one or more of Electronic Product code (EPC) or Department of Defense (DOD) formats. In some examples, the RFID encoder 408 may be configured to transmit the data (for the purpose of encoding the RFID inlay 107) over one or more frequency bands such as, but not limited to, 13.56 MHz (hereinafter "High Frequency band" or "HF") or 860 MHz-960 MHZ (hereinafter "UHF band"), through the RFID coupler/antenna element 416. Further, the RFID encoder 408 may be configured to modulate the data on an RF carrier of either HF frequency band or UHF band prior to transmitting the data for encoding the RFID inlay 107. Some examples of the modulation techniques utilized by the RFID encoder 408 include, but are not limited to, Phase Jitter Modulation (PJM), Amplitude Shift Keying (ASK), and/or the like.

In some examples, the RFID encoder 408 may be configured to transmit one or more commands to the RFID inlay 107 on each of the plurality of labels 106, causing the RFID inlay 107 to perform a predetermined operation in accordance with the one or more commands. For example, the RFID encoder 408 may transmit a command "Write" that indicates to the RFID inlay 107 to write the data accompanied with the command in the memory of the RFID inlay 107. Similarly, the RFID encoder 408 may transmit other commands to the RFID inlay 107 such as but not limited to "Lock", "Access", "Block Write", and/or any other command according to the EPC global standards.

The RFID reader 410 includes suitable logic and circuitry for reading data from the RFID inlay 107. To read the data encoded in the RFID inlay 107, the RFID reader 410 may transmit an interrogation command to the RFID inlay over the one or more frequency bands such as HF and UHF. Further, similar to the RFID encoder 408, the RFID reader 410 may also utilize the one or more modulation techniques such as ASK and PJM to transmit the interrogation command on the one or more frequency bands. In response to the interrogation command, the RFID reader 410 may receive the encoded data from the RFID inlay 107. In an example embodiment, the RFID reader 410 may utilize the RFID coupler/antenna element 416 to transmit the interrogation command and receive the encoded data from the RFID inlay 107.

In some examples, both the RFID reader 410 and the RFID encoder 408 may include one or more of filters, analog to digital (A/D) converters, Digital to Analog (D/A) convertors, matching circuits, amplifiers, and/or tuners that enable the RFID reader 410 and the RFID encoder 408 to transmit and receive data over the one or more frequency bands through the RFID coupler/antenna element 416.

Figure 6:
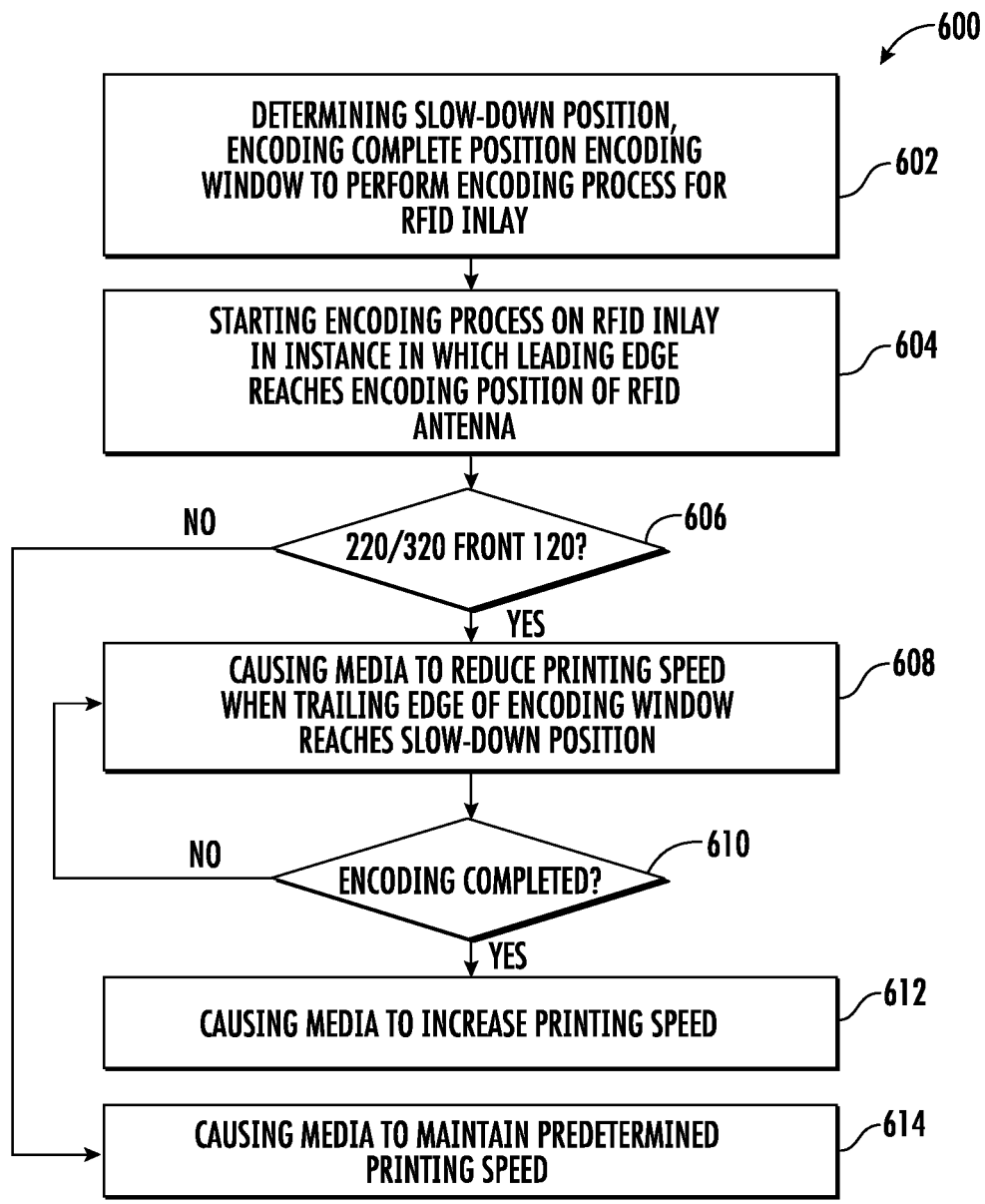
FIG. 6 illustrates an exemplary method for RFID labels, in accordance with various embodiments of the present disclosure.

The verification unit 412 includes suitable logic and circuitry that is configured to verify whether the encoding of the RFID inlay 107 is successful, as further described in FIG. 6. In some examples, to determine whether the encoding is successful, the verification unit 412 may determine an encode success rate. The verification unit 412 may be implemented using one or more hardware components, such as, but not limited to, FPGA, ASIC, and the like.

The power modification unit 414 includes suitable logic and circuitry that is configured to manage a signal transmission power of the RFID coupler/antenna element 416. In an example embodiment, the signal transmission power corresponds to a transmitter power output at which a signal is transmitted from the RFID coupler/antenna element 416. In an example embodiment, the power modification unit 414 may be configured to modify the signal transmission power in accordance with a plurality of power settings. In an example embodiment, a power setting may correspond to a value of the signal transmission power with which the data is transmitted from the RFID coupler/antenna element 416. In some examples, the power modification unit 414 may modify input voltage to the RFID coupler/antenna element 416 to modify the signal transmission power. In an example embodiment, the power modification unit 414 may modify the signal transmission power in response to an instruction received from the controller component 150. The power modification unit 414 may be implemented using one or more hardware components, such as, but not limited to, FPGA, ASIC, and the like.

Figure 5:
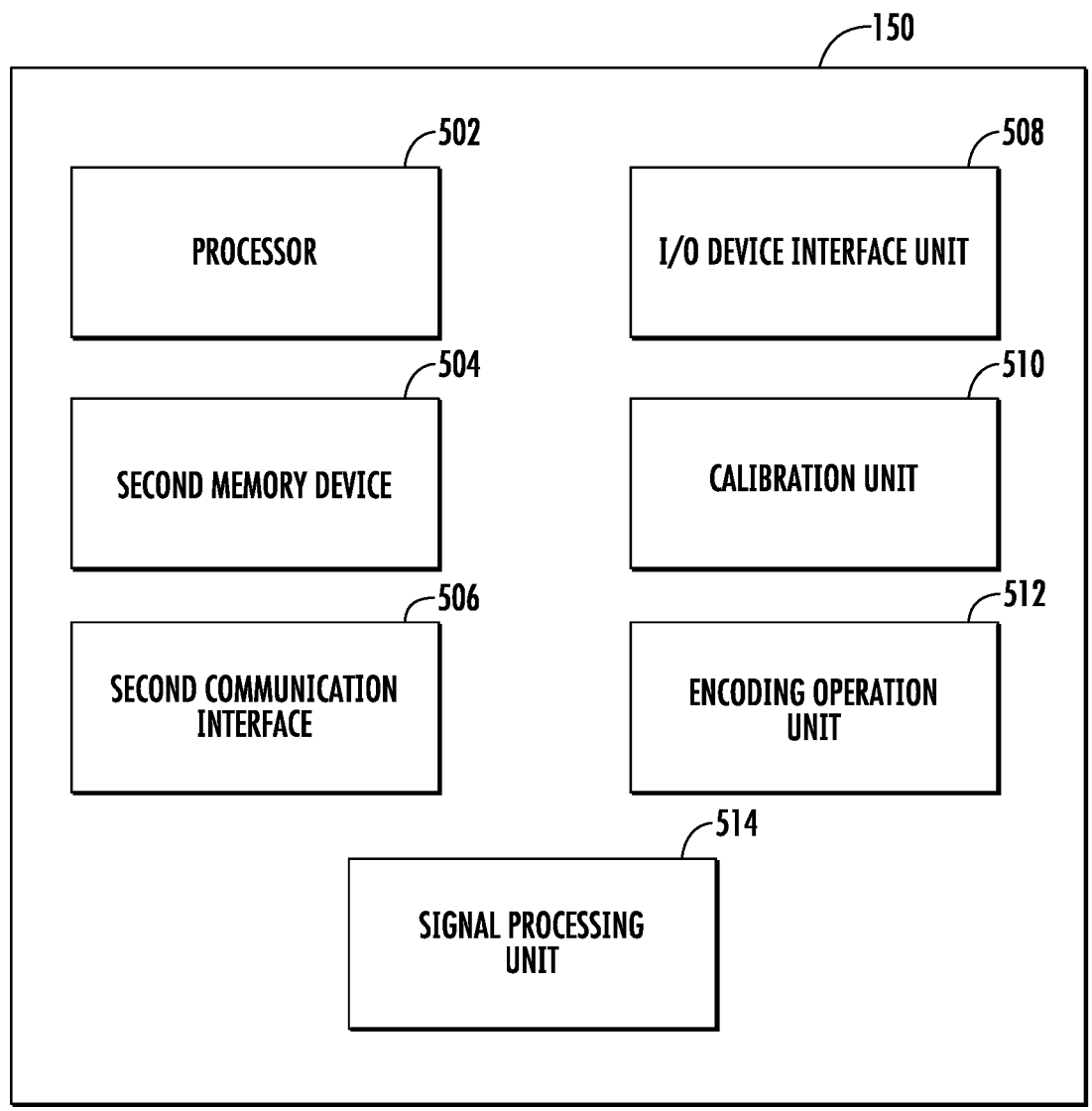
FIG. 5 illustrates an example block diagram of a controller component of an example printer, in accordance with various embodiments of the present disclosure.

FIG. 5 illustrates a block diagram of the controller component 150 of the printer 100, 200, and 300, according to one or more embodiments described herein. The controller component 150 includes a processor 502, a second memory device 504, a second communication interface 506, an input/output (I/O) device interface unit 508, a calibration unit 510, an encoding operation unit 512, and a signal processing unit 514.

The processor 502 may be embodied as means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit (ASIC) or field programmable gate array (FPGA), or some combination thereof. Accordingly, although illustrated in FIG. 5 as a single processor, in an embodiment, the processor 502 may include a plurality of processors and signal processing modules. The plurality of processors may be embodied on a single electronic device or may be distributed across a plurality of electronic devices collectively configured to function as the circuitry of the controller component 150. The plurality of processors may be in operative communication with each other and may be collectively configured to perform one or more functionalities of the circuitry of the controller component 150, as described herein. In an example embodiment, the processor 502 may be configured to execute instructions stored in the second memory device 504 or otherwise accessible to the processor 502. These instructions, when executed by the processor 502, may cause the circuitry of the controller component 150 to perform one or more of the functionalities, as described herein.

Whether configured by hardware, firmware/software methods, or by a combination thereof, the processor 502 may include an entity capable of performing operations according to embodiments of the present disclosure while configured accordingly. Thus, for example, when the processor 502 is embodied as an ASIC, FPGA or the like, the processor 502 may include specifically configured hardware for conducting one or more operations described herein. Alternatively, as another example, when the processor 502 is embodied as an executor of instructions, such as may be stored in the second memory device 504, the instructions may specifically configure the processor 502 to perform one or more algorithms and operations described herein.

Thus, the processor 502 used herein may refer to a programmable microprocessor, microcomputer or multiple processor chip or chips that can be configured by software instructions (applications) to perform a variety of functions, including the functions of the various embodiments described above. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. The memory can also be located internal to another computing resource (e.g., enabling computer readable instructions to be downloaded over the Internet or another wired or wireless connection).

The second memory device 504 may include suitable logic, circuitry, and/or interfaces that are adapted to store a set of instructions that is executable by the processor 502 to perform predetermined operations. Some of the commonly known memory implementations include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an example embodiment, the second memory device 504 may be integrated with the processor 502 on a single chip, without departing from the scope of the disclosure.

The second communication interface 506 may correspond to a second communication interface 506 that may facilitate transmission and reception of messages and data to and from various devices. For example, the second communication interface 506 is communicatively coupled with a computing device (not shown). For example, through the second communication interface 506, the printer 100, 200, or 300 may be configured to receive commands/jobs from the computing device based on which the printer 100, 200, or 300 may perform predetermined operation. Examples of the second communication interface 506 may include, but are not limited to, an antenna, an Ethernet port, a USB port, a serial port, or any other port that can be adapted to receive and transmit data. The second communication interface 506 transmits and receives data and/or messages in accordance with the various communication protocols, such as, I2C, TCP/IP, UDP, and 2G, 3G, 4G or 5G communication protocols.

The I/O device interface unit 508 may include suitable logic and/or circuitry that may be configured to communicate with the one or more components of the printer 100, 200, or 300, in accordance with one or more device communication protocols such as, but not limited to, I2C communication protocol, Serial Peripheral Interface (SPI) communication protocol, Serial communication protocol, Control Area Network (CAN) communication protocol, and 1-Wire® communication protocol. In an example embodiment, the I/O device interface unit 508 may communicate with other components of the printer 100, 200, or 300. Further, for example, the I/O device interface unit 508 may actuate the electrical drive associated with media 104 to cause the media 104 to traverse along the media path 105. Some examples of the I/O device interface unit 508 may include, but not limited to, a Data Acquisition (DAQ) card, an electrical drives driver circuit, and/or the like.

The calibration unit 510 may include suitable logic and/or circuitry for calibrating the printer 100, 200, or 300. In an example embodiment, the calibration unit 510 may be configured to determine one or more properties of the media 104. Some examples of the one or more properties of the media 104 may include, but are not limited to, a length of the at least one label 106, a type of the media 104, and/or the like. For the purpose of ongoing description, the calibration unit 510 determines the length of the at least one label 106 in the media 104. The calibration unit 510 may be implemented using one or more hardware components, such as, but not limited to, FPGA, ASIC, and the like.

The encoding operation unit 512 may include suitable logic and/or circuitry for operating the printer 100, 200, or 300 in the encoding mode. In an example embodiment, the encoding operation unit 512 may be configured to cause the RFID encoder 408 in the RFID antenna 101 to encode the RFID inlay 107 on the labels 106, through the RFID coupler/antenna element 416. The encoding operation unit 512 may be implemented using one or more hardware components, such as, but not limited to, FPGA, ASIC, and the like.

The signal processing unit 514 may include suitable logic and/or circuitry for analyzing the input signal received from a media sensor. For example, the signal processing unit 514 may include a digital signal processor 502 that may be configured to identify the peaks and the valleys in the input signal. Further, the signal processing unit 514 may utilize one or more signal processing techniques such as, but not limited to, Fast Fourier Transform (FFT), Discrete Fourier Transform (DFT), Discrete Time Fourier Transform (DTFT) to analyze the input signal. The signal processing unit 514 may be implemented using one or more hardware components, such as, but not limited to, FPGA, ASIC, and the like.

In some examples the scope of the disclosure is not limited to having a separate controller component 150 for the printer 100, 200, or 300. In an alternative embodiment, various units/modules of the controller component 150 may be implemented on the RFID antenna 101, forming an integrated, single apparatus, without departing from the scope of the disclosure. In another alternative embodiment, various functionalities of the RFID antenna 101 may be implemented in the controller component 150, forming an integrated, single apparatus, without departing from the scope of the disclosure. In such an implementation, the RFID coupler/antenna element 416 may be directly communicatively coupled to the controller component 150.

Referring now to FIG. 6, an exemplary method 600 for encoding radio frequency identification (RFID) labels in accordance with some exemplary embodiments described herein is illustrated. The exemplary method 600 may be executed by a computing device associated with a controller component (for example, the controller component 150 as illustrated and described above in connection with at least FIG. 1, FIG. 2A, and FIG. 3A) including processing circuitry and memory (for example, the processor 502 and the second memory device 504 as illustrated and described above in connection with at least FIG. 5).

At step/operation 602, the controller component 150 may determine a slow-down position 120 and an encoding complete position (e.g., 220/320) along a media moving direction 110 in the printer, an encoding window 108 for each of the at least one label 106 to perform an encoding process for the at least one RFID inlay 107.

In some embodiments, as shown in FIG. 1, the media 104 may comprise at least one label 106, and the at least one label 106 may comprise at least one RFID inlay 107.

In some embodiments, the media path 105 may be defined as a travelling path by the example printer 100 along a media moving direction 110. In some examples, the at least one label 106 is part of the media 104 that is traveling along the media moving direction 110 in the printer at a predetermined printing speed or standard print speed. In some examples, the media 104 may be driven by an electrical drive to travel along the media path 105. In some examples, the speed V of the media 104 may be set at the predetermined printing speed or standard print speed.

In some embodiments, the encoding window 108 may comprise a leading edge 108a and a trailing edge 108b.

In some examples, the slow-down position 120 may be determined based on a speed V of the media 104 and an acceleration α of the electric drive. For example, the slow-down position 120 may be positioned along the media path 105.

In some examples, the encoding complete position (e.g., 220/320) may be determined based on the predetermined printing speed and an encoding speed of the RFID antenna 101.

In some embodiments, as shown in FIG. 2A, the encoding complete position 220 may be positioned on a back side of the slow-down position 120 when viewed from the media moving direction 110, such that the encoding window 108 may reach the encoding complete position 220 before the slow-down position 120. That is, the encoding process is complete before the trailing edge 108b reaches the slow-down position 120.

In some embodiments, as shown in FIG. 3A, the encoding complete position 320 may be positioned on a front side of the slow-down position 120 when viewed from the media moving direction 110, such that the encoding window 108 may reach the slow-down position 120 before the encoding complete position 320. That is, the encoding process is not complete when the trailing edge 108b reaches the slow-down position 120.

At step/operation 604, the controller component 150 may start the encoding process on the at least one RFID inlay 107 when the leading edge 108a reaches an encoding area 109 of an RFID antenna 101.

In some embodiments, the encoding area 109 of an RFID antenna 101 may be located along the media path 105. In some embodiments, the encoding area 109 of an RFID antenna 101 may be located between the dispenser 103 and the print head 102.

At step/operation 606, the controller component 150 may determine if the encoding complete position (e.g., 220/320) is positioned on a front side of the slow-down position 120 when viewed from the media moving direction 110.

In some embodiments, in an instance in which the encoding complete position (e.g., 320) is positioned on the front side of the slow-down position 120 when viewed from the media moving direction, the exemplary method 600 may proceed to step/operation 608.

In some embodiments, in an instance in which the encoding complete position (e.g., 220) is positioned on a back side of the slow-down position 120 when viewed from the media moving direction, the exemplary method 600 may proceed to step/operation 614.

At step/operation 608, the controller component 150 may cause the media 104 to reduce the printing speed when the trailing edge 108b of the encoding window 108 reaches the slow-down position 120.

In some embodiments, the speed V of the media 104 may be set at a predetermined printing speed or standard print speed. For example, the media 104 that is driven by the electrical drive may start slowing down when the trailing edge 108b of the encoding window 108 reaches the slow-down position 120, such that the media 104 may be able stop moving when the trailing edge 108b reaches the downstream edge 109b of the encoding area 109.

In some embodiments, the slow-down position 120 may be determined based on a speed V of the media 104 and an acceleration αof the electric drive. In some examples, a distance D between the slow-down position 120 and a downstream edge 109a of the encoding area 109 may be calculated based on Eq. 1.

In some examples, in an instance in which the encoding process on the RFID inlay 107 is not completed before the trailing edge 108b reaches the slow-down position 120, the speed of the media 104 may start slowing down when the trailing edge 108b reaches the slow-down position 120, such that the media 104 is able to stop moving at or about when the trailing edge 108b reaches the downstream edge 109a of the encoding area 109. For example, the speed of the media 104 may be zero when the downstream edge 109a of the encoding area 109. In some examples, the speed of the media 104 may be maintained at zero, such that the encoding process for the RFID inlay 107 may be completed while the trailing edge 108b is at the downstream edge 109a of the encoding area 109.

At step/operation 610, the controller component 150 may determine if the encoding process is completed.

In some embodiments, in an instance in which the encoding process is completed, the exemplary method 600 may proceed to step/operation 612.

In some embodiments, in an instance in which the encoding process is not completed, the exemplary method 600 may proceed to step/operation 608.

At step/operation 612, the controller component 150 may cause the media 104 to increase the printing speed.

In some embodiments, the media 104 may start moving again after the encoding process for the RFID inlay 107 is completed. For example, the speed of the media 104 may increase gradually and be maintained at the predetermined print speed after the encoding process for the RFID inlay 107 is completed.

At step/operation 614, the controller component 150 may cause the media to maintain the printing speed at the predetermined printing speed or standard print speed.

In some examples, in an instance in which the encoding process on the RFID inlay 107 is completed before the trailing edge 108b reaches the slow-down position 120, the speed of the media 104 may be maintained at the predetermined printing speed or standard print speed.

As described above and as will be appreciated based on this disclosure, embodiments of the present disclosure may include various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

What is claimed is:

1. A method for encoding radio frequency identification (RFID) labels comprising:
   determining, by a controller component of a printer, a slow-down position and an encoding complete position along a media moving direction in the printer and an encoding window associated with an RFID label for performing an encoding process on at least one RFID inlay of the RFID label, wherein the encoding window comprises a leading edge and a trailing edge, wherein the RFID label is part of a media that is traveling along the media moving direction in the printer at a printing speed and driven by an electrical drive;
   starting, by the controller component, the encoding process on the at least one RFID inlay in an instance in which the leading edge reaches an encoding area of an RFID antenna;
   determining, by the controller component, if the encoding complete position is positioned on a front side of the slow-down position when viewed from the media moving direction;
   in an instance in which the encoding complete position is positioned on the front side of the slow-down position when viewed from the media moving direction, transmitting, by the controller component, commands to the electrical drive via an input/output (I/O) device interface unit to reduce the printing speed when the trailing edge of the encoding window reaches the slow-down position; and
in an instance in which the encoding complete position is positioned on a back side of the slow-down position when viewed from the media moving direction, transmitting, by the controller component, commands to the electrical drive via the I/O device interface unit to maintain the printing speed at a predetermined printing speed.

2. The method according to claim 1, wherein the leading edge is positioned on a front side of the trailing edge when viewed from the media moving direction.

3. The method according to claim 2, wherein the printing speed is reduced to zero in an instance in which the trailing edge reaches a downstream edge of the encoding area of the RFID antenna.

4. The method according to claim 1, wherein the encoding complete position is determined based on the predetermined printing speed and an encoding speed of the RFID antenna.

5. The method according to claim 1, further comprising:
determining, by the controller component, if the encoding process is completed;
in an instance in which the encoding process is completed, transmitting, by the controller component, commands to the electrical drive via the I/O device interface unit to increase the printing speed; and
in an instance in which the encoding process is not completed, transmitting, by the controller component, commands to the electrical drive via the I/O device interface unit to continue reducing the printing speed.

6. The method according to claim 5, wherein the printing speed is increased to the predetermined printing speed after the encoding process is completed.

7. The method according to claim 1, wherein the slow-down position is determined based on the predetermined printing speed.

8. The method according to claim 1, wherein the RFID antenna is communicatively coupled to the controller component and configured to transmit signals to encode the at least one RFID inlay.

9. The method according to claim 1, wherein the printer further comprises a print head communicatively coupled to the controller component and configured to print contents on the RFID label.

10. The method according to claim 1, wherein the printer further comprises a dispenser communicatively coupled to the controller component and configured to output the media.

11. A printer for encoding radio frequency identification (RFID) labels, comprising:
an RFID antenna;
an electrical drive for driving a media to travel along a media moving direction in the printer at a printing speed, wherein the media comprises an RFID label; and
a controller component communicatively coupled to the electrical drive and configured to:
determine a slow-down position and an encoding complete position along the media moving direction in the printer and an encoding window associated with the RFID label for performing an encoding process on at least one RFID inlay of the RFID label, wherein the encoding window comprises a leading edge and a trailing edge, wherein the RFID label is part of the media;
start the encoding process on the at least one RFID inlay in an instance in which the leading edge reaches an encoding area of the RFID antenna;
determine if the encoding complete position is positioned on a front side of the slow-down position when viewed from the media moving direction;
in an instance in which the encoding complete position is positioned on the front side of the slow-down position when viewed from the media moving direction, transmit commands to the electrical drive via an input/output (I/O) device interface unit to reduce the printing speed when the trailing edge of the encoding window reaches the slow-down position; and
in an instance in which the encoding complete position is positioned on a back side of the slow-down position when viewed from the media moving direction, transmit commands to the electrical drive via the I/O device interface unit to maintain the printing speed at a predetermined printing speed.

12. The printer according to claim 11, wherein the leading edge is positioned on a front side of the trailing edge when viewed from the media moving direction.

13. The printer according to claim 12, wherein the printing speed is reduced to zero in an instance in which the trailing edge reaches a downstream edge of the encoding area of the RFID antenna.

14. The printer according to claim 11, wherein the encoding complete position is determined based on the predetermined printing speed and an encoding speed of the RFID antenna.

15. The printer according to claim 11, wherein the controller component is further configured to:
determine if the encoding process is completed;
in an instance in which the encoding process is completed, transmit commands to the electrical drive via the I/O device interface unit to increase the printing speed; and
in an instance in which the encoding process is not completed, transmit commands to the electrical drive via the I/O device interface unit to continue reducing the printing speed.

16. The printer according to claim 15, wherein the printing speed is increased to the predetermined printing speed after the encoding process is completed.

17. The printer according to claim 11, wherein the slow-down position is determined based on the predetermined printing speed.

18. The printer according to claim 11, wherein the RFID antenna is communicatively coupled to the controller component and configured to transmit signals to encode the at least one RFID inlay.

19. The printer according to claim 11, wherein the printer further comprises a print head communicatively coupled to the controller component and configured to print contents on the RFID label.

20. The printer according to claim 11, wherein the printer further comprises a dispenser communicatively coupled to the controller component and configured to output the media.

* * * * *